(12) United States Patent
Kamei (10) Patent No.: US 9,424,655 B2
(45) Date of Patent: Aug. 23, 2016

(54) IMAGE PROCESSING APPARATUS, METHOD, AND STORAGE MEDIUM FOR ANALYZING CHANGES IN VIDEO

(75) Inventor: Yoichi Kamei, Yamato (JP)

(73) Assignee: Canon Kabushiki Kaisha, Tokyo (JP)

( * ) Notice: Subject to any disclaimer, the term of this patent is extended or adjusted under 35 U.S.C. 154(b) by 809 days.

(21) Appl. No.: 13/102,435

(22) Filed: May 6, 2011

(65) Prior Publication Data

US 2011/0273619 A1 Nov. 10, 2011

(30) Foreign Application Priority Data

May 10, 2010 (JP) .................................. 2010-108783

(51) Int. Cl.
| | |
|---|---|
| *H04N 5/225* | (2006.01) |
| *G06T 7/20* | (2006.01) |
| *H04N 7/18* | (2006.01) |

(52) U.S. Cl.
CPC ......... *G06T 7/20* (2013.01); *G06T 2207/10016* (2013.01); *G06T 2207/30232* (2013.01)

(58) Field of Classification Search
CPC ............ G06T 7/20; G06T 2207/10016; G06T 2207/30232; G06T 2207/30242; G06T 2204/10016
USPC .................................................. 348/169–170
See application file for complete search history.

(56) References Cited

U.S. PATENT DOCUMENTS

| | | | |
|---|---|---|---|
| 6,999,600 B2* | 2/2006 | Venetianer et al. | 382/103 |
| 7,421,727 B2* | 9/2008 | Oya et al. | 725/105 |
| 7,423,667 B2* | 9/2008 | Hayasaka | 348/143 |
| 7,423,669 B2* | 9/2008 | Oya et al. | 348/208.14 |
| 7,778,445 B2* | 8/2010 | Au | G06K 9/00771 382/103 |
| 7,907,180 B2* | 3/2011 | Takayama | 348/211.8 |
| 8,031,228 B2* | 10/2011 | Okamoto | 348/169 |
| 8,134,596 B2* | 3/2012 | Lei et al. | 348/169 |
| 8,238,605 B2* | 8/2012 | Chien | G06K 9/00771 382/103 |
| 8,284,249 B2* | 10/2012 | Feris et al. | 348/143 |
| 8,374,388 B2* | 2/2013 | Stolkin et al. | 382/103 |
| 8,422,791 B2* | 4/2013 | Liu et al. | 382/199 |
| 8,610,787 B2* | 12/2013 | Namba et al. | 348/222.1 |
| 8,773,548 B2* | 7/2014 | Kobayashi | G06K 9/036 348/222.1 |
| 2007/0070201 A1* | 3/2007 | Yokomitsu et al. | 348/169 |
| 2007/0279494 A1* | 12/2007 | Aman et al. | 348/169 |
| 2009/0219391 A1* | 9/2009 | McLeish et al. | 348/143 |
| 2014/0233793 A1* | 8/2014 | Zong | 382/103 |

FOREIGN PATENT DOCUMENTS

| | | |
|---|---|---|
| CN | 1391404 A | 1/2003 |
| CN | 1925626 A | 3/2007 |
| CN | 101115149 A | 1/2008 |
| CN | 101325662 A | 12/2008 |
| CN | 101426088 A | 5/2009 |
| JP | 2004-248090 A | 9/2004 |
| JP | 2008-16898 A | 1/2008 |
| WO | 2005/074248 A1 | 8/2005 |

* cited by examiner

*Primary Examiner* — Ngoc-Yen Vu (74) *Attorney, Agent, or Firm* — Canon USA Inc. IP Division (57) ABSTRACT

An image processing apparatus includes an acquisition unit configured to acquire a video, a superimposition unit configured to superimpose an image onto the video acquired by the acquisition unit, and a detection unit configured to detect the emergence of an object in a video in a detection area set on the video acquired by the acquisition unit, wherein the superimposition unit superimposes an image corresponding to the size of the object to be detected when emerging by the detection unit onto the video in the detection area, and outputs the resultant video to the detection unit.

16 Claims, 9 Drawing Sheets

IMAGE PROCESSING APPARATUS, METHOD, AND STORAGE MEDIUM FOR ANALYZING CHANGES IN VIDEO

BACKGROUND OF THE INVENTION

1. Field of the Invention

The present invention relates to an image processing apparatus for analyzing changes in a video through image processing.

2. Description of the Related Art

A known conventional imaging system detects changes in a video captured by a camera. To detect changes in a video captured by such an imaging system, a user needs to preset parameters for performing detection processing, such as a screen area subjected to detection processing, a position and size of an object to be detected in an area under detection, and a sensitivity of image processing. These parameters are set according to the position, size, color of the object to be detected, surrounding circumstances, and image-capturing conditions of the camera.

With a conventional imaging system, parameters for performing detection processing are set in the following way. A user captures the motion of an object to be detected and surrounding circumstances in advance, and stores the captured video in a storage unit in an operation terminal via a camera server. Then, the user sets parameters for detection processing while playing back the video stored in the storage unit in the operation terminal (for example, as discussed in Japanese Patent Application Laid-Open No. 2004-248090).

With a known image processing apparatus, a range subjected to detection processing is specified in a video captured by a camera. A user draws a graphic pattern on a display, on which the video is displayed, to set a detection range, and determines a result of range setting on the display (for example, as discussed in Japanese Patent Application Laid-Open No. 2008-16898).

To set parameters for performing detection processing, it is necessary to capture the state of an object to be detected as changes in a video and surrounding circumstances by using an imaging apparatus in advance, and verify whether detection processing is correctly performed based on the set parameters. Conventional imaging systems, when setting parameters for performing detection processing, have required manpower and operation for capturing the state of an object to be detected and surrounding circumstances by using a camera.

SUMMARY OF THE INVENTION

The present invention is directed to an image processing apparatus which requires less manpower and operation necessary to set parameters for performing detection processing than conventional imaging systems.

According to an aspect of the present invention, an image processing apparatus includes an acquisition unit configured to acquire a video, a superimposition unit configured to superimpose an image onto the video acquired by the acquisition unit, and a detection unit configured to detect emergence of an object in a video in a detection area set on the video acquired by the acquisition unit, wherein the superimposition unit superimposes an image corresponding to the size of the object to be detected when emerging by the detection unit onto the video in the detection area, and outputs the resultant video to the detection unit.

When setting parameters for performing processing for detecting changes in a video, the image processing apparatus according to the present invention superimposes an image onto a video within a range subjected to detection processing to demonstrate a state of an object to be detected. Therefore, it is not necessary that a person goes to a camera and move the object to be detected to produce a state of the object to be detected. This enables reducing manpower and operation necessary to set parameters for performing detection processing.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DESCRIPTION OF THE EMBODIMENTS

Various exemplary embodiments, features, and aspects of the invention will be described in detail below with reference to the drawings. Configurations illustrated in the following exemplary embodiments are to be considered as an example, and the present invention is not limited thereto.

Figure 1A:
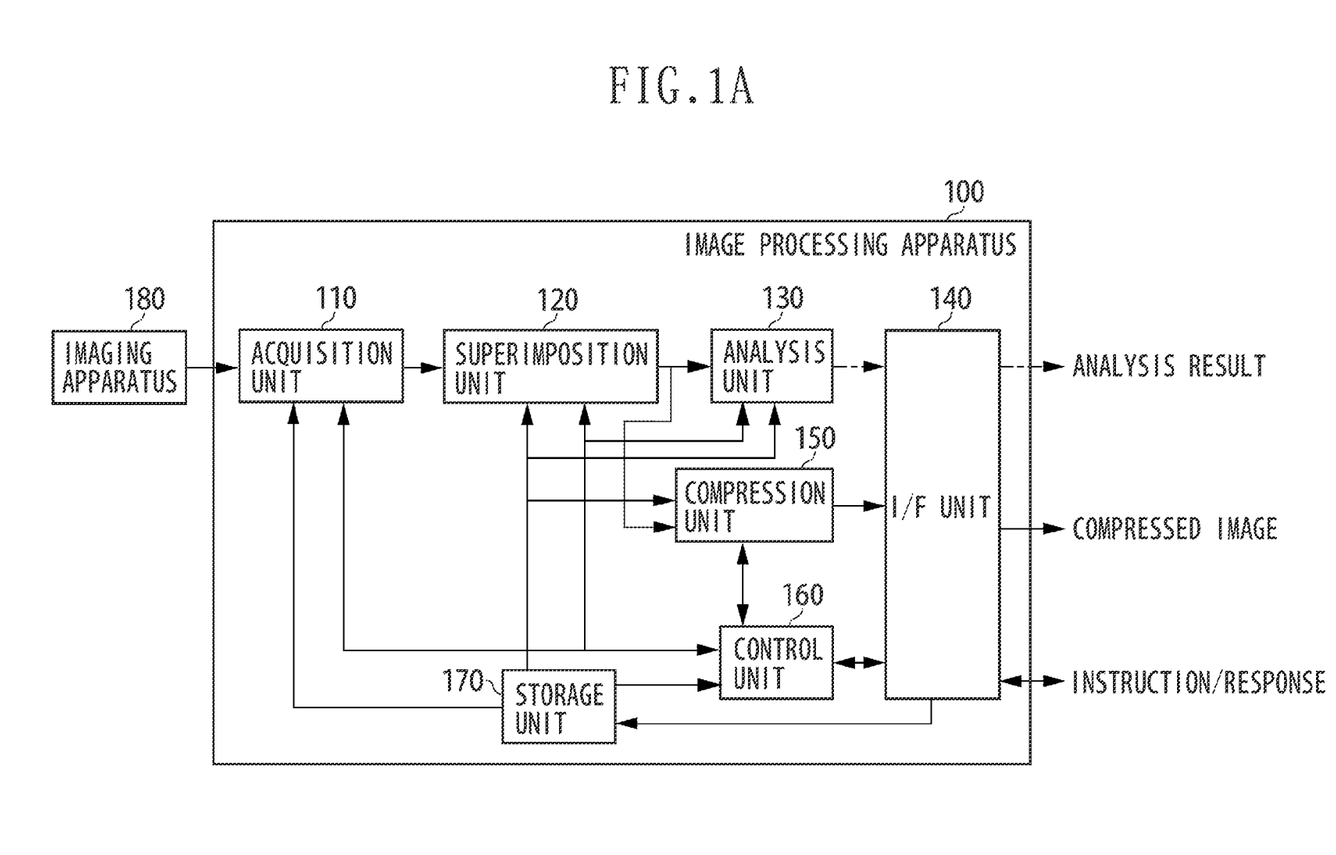
FIGS. 1A and 1B are block diagrams illustrating a configuration of an image processing apparatus.

The image processing apparatus according to a first exemplary embodiment of the present invention will be described below with reference to FIGS. 1A, 1B, 2, 3A, and 3B. FIG. 1A is a block diagram illustrating a configuration of the image processing apparatus according to the first exemplary embodiment of the present invention. Upon reception of an image, an image processing apparatus 100 outputs a compressed image and an analysis result of the input image.

An acquisition unit 110 captures successive images as a video from an imaging apparatus 180 such as a video camera and a video recorder connected to the image processing apparatus 100. The acquisition unit 110 performs analog/digital (A/D) conversion and size conversion according to an instruction from a control unit 160 (described below), and outputs the video to a superimposition unit 120. The acquisition unit 110 achieves a function of acquiring a video in this way.

According to an instruction from the control unit 160 (described below), the superimposition unit 120 superimposes an image onto the video acquired by the acquisition unit 110. The image to be superimposed onto the video is, for example, a character string indicating time information, a polygon or ellipse filled with a certain color, an image separately captured and stored, or a computer graphics image.

The superimposition unit 120 may be configured by an existing drawing function such as a superimposition function of superimposing a character or graphic pattern onto an image, and a privacy mask function of superimposing a mask image onto a predetermined image for privacy protection.

The superimposition unit 120 superimposes onto a video an image corresponding to the size of an object that is detected as emerging by a detection unit 131 (described below) in a preset area (hereinafter referred to as detection area) subjected to object detection by the detection unit 131. The superimposition unit 120 transmits the video having the image superimposed thereon to an analysis unit 130 and a compression unit 150.

The compression unit 150 compresses the image based on a compression method and a compression rate specified by an instruction from the control unit 160 (described below), and outputs the compressed image to the outside of the image processing apparatus 100 via an interface (I/F) unit 140. The compression method is based on standards Motion JPEG, MPEG4, H.264, and JPEG.

Figure 1B:
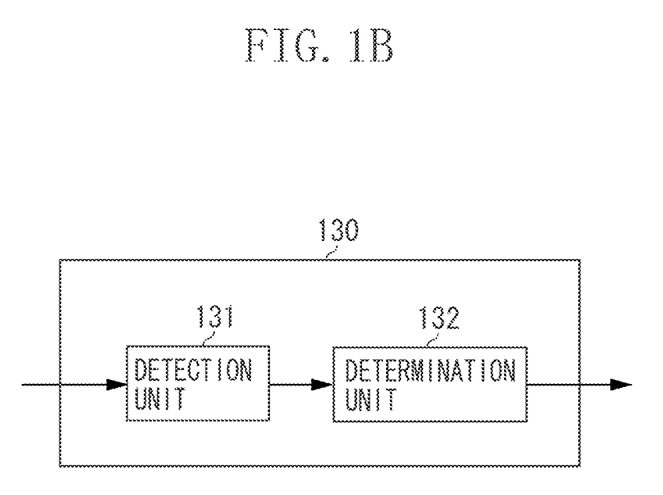

The analysis unit 130 detects the emergence of an object in the preset area on the image by using the frame difference method or background difference method, and determines the state of the object. As illustrated in FIG. 1B, the analysis unit 130 includes the detection unit 131 and a determination unit 132. The detection unit 131 detects the emergence of an object in a video in the detection area set on the video acquired by the acquisition unit 110. Based on a result of detection by the detection unit 131, the determination unit 132 determines the state of the object in the video in the detection area.

An exemplary object state "abandoning" is a state where an object emerges in the detection area and remains still at the same position for a preset duration or longer. Another exemplary object state "removing" is a state where the object under monitoring is removed and then a new object, such as a wall or floor surface that has been covered by the object under monitoring, emerges and remains still for a preset duration or longer.

The detection unit 131 detects the emergence of an object based on the inter-frame difference method and the background difference method. These techniques obtain a difference, for example, in luminance between frames and recognizes as an emerging object an area having a difference equal to or larger than a preset threshold value.

In a case where the object detected as emerging by the detection unit 131 remains still for a predetermined duration, the determination unit 132 determines that the object is in the "abandoning" state. In a case where an object in the detection area is removed and the detection unit 131 detects that a new object that has been covered by the object emerges, the determination unit 132 determines that the object is in the "removing" state.

As mentioned above, object detection is achieved by obtaining a difference in luminance between frames, and an area having a difference exceeding a preset threshold value is recognized as an emerging object. Therefore, even when there is actually no object emerging in the video, giving an artificial difference in luminance to a certain portion in the video enables the portion to be detected as an object.

The present exemplary embodiment uses this technique to perform verification of the object state analysis. Specifically, the control unit 160 instructs the superimposition unit 120 to superimpose a graphic pattern equivalent to an emerging object onto an input image to generate a difference in luminance. Then, the control unit 160 instructs the analysis unit 130 to detect the difference as the "abandoning" or "removing" state. Various settings stored in a storage unit 170 (described below) are used as conditions for detecting the "abandoning" or "removing" state. Thus, the analysis unit 130 determines whether the video containing the image superimposed by the superimposition unit 120 satisfies the conditions stored in the storage unit 170.

Although the present exemplary embodiment will be described below based on a case where the analysis unit 130 analyzes "abandoning" and "removing", the present invention is not limited thereto but may be based on any function of detecting an emerging object in a set area and analyzing the state of the object. For example, the present invention may analyze that an object under monitoring disappears for a predetermined duration because a camera is covered by a cloth or paint. The image processing apparatus 100 outputs an analysis result via the I/F unit 140.

The storage unit 170 stores operation settings for the acquisition unit 110, the superimposition unit 120, the analysis unit 130, and the compression unit 150. The acquisition unit 110, the superimposition unit 120, the analysis unit 130, and the compression unit 150 hold respective operation settings. The operation settings for the acquisition unit 110 include, for example, settings of a conversion magnification and a size after conversion in size conversion of the acquired image.

The operation settings for the superimposition unit 120 include, for example, settings of a shape, size, and range of a graphic pattern to be superimposed onto the input image, and a color and a pause duration of the graphic pattern to be superimposed thereon.

When the pause duration is t seconds, a graphic pattern is kept superimposed onto frames up to a frame t seconds. When detecting "abandoning" of an object, although a black image may be generally superimposed, a sufficient difference in luminance may not be obtained depending on a situation such as capturing a video outdoors during the night. Therefore, a color which is significantly different from the color (for example, opponent color) of the object may be set as the color of the image to be superimposed to ensure detection of abandoning.

On the other hand, when detecting "removing" of an object, a black graphic pattern may be generally superimposed. However, to increase the accuracy of verification, it is further desirable to set a color of a wall or floor surface emerging after the object under monitoring is abandoned as the color to be superimposed. Since a wall or floor surface often emerges around the detection area, the color of the outer edge the detection area or a similar color may be selected as the color to be superimposed.

The operation settings for the analysis unit 130 include, for example, settings of an object state analysis type ("abandoning" and "removing"), a screen area subjected to object detection, a size, a pause duration of an object under monitoring, and a detection sensitivity. However, the operation settings are not limited thereto. Further, not all of the above operation settings need to be set.

The pause duration refers to a time interval during which an object emerges in the detection area and remains still. When the object remains still for a preset duration, the determination unit 132 of the analysis unit 130 determines the occurrence of "abandoning" or "removing."

The detection sensitivity will be described below. The detection unit 131 of the analysis unit 130 compares a difference in luminance between pixels at the same pixel position in adjacent video frames. When the difference is equal to or larger than the set detection sensitivity, the detection unit 131 of the analysis unit 130 determines that the relevant pixel has changed. Thus, the operation settings for the analysis unit 130 are used by the analysis unit 130 as conditions for detecting the emergence of an object in the video in the detection area and determining the object state.

The operation settings for the compression unit 150 include, for example, settings of a compression method and a compression rate of an image input to the compression unit 150.

The control unit 160 receives an instruction from a user terminal via the I/F unit 140, controls the operations of the acquisition unit 110, the superimposition unit 120, the analysis unit 130, and the compression unit 150, and returns a response to the user. These control operations are performed by a processor and a memory included in the control unit 160.

The processor included in the control unit 160 is a computer which reads a program from the memory included therein and then executes it. The memory included in the control unit 160 is a recording medium storing the program so as to be read by the processor. The program will be described below with reference to FIG. 2.

An instruction for verifying the operation of the analysis unit 130 and an instruction for holding settings will be described below as user instructions received by the control unit 160.

The instruction for verifying the operation of the analysis unit 130 is an instruction to instruct the image processing apparatus 100 to verify whether the analysis unit 130 detects the "abandoning" and "removing" states based on the operation settings stored in the storage unit 170. Upon reception of the instruction for verifying the operation of the analysis unit 130, the control unit 160 performs control derived from the settings for the analysis unit 130 to the superimposition unit 120.

The instruction for holding settings is an instruction to instruct the image processing apparatus 100 to hold the operation settings for the acquisition unit 110, the superimposition unit 120, the analysis unit 130, and the compression unit 150. Upon reception of the instruction for holding settings, the control unit 160 stores in the storage unit 170 the operation settings for the acquisition unit 110, the superimposition unit 120, the analysis unit 130, and the compression unit 150. The stored operation settings are used as default operations for each unit to be performed when no control instruction is received from the user.

The I/F unit 140 is connected with the user terminal via a network (not illustrated) to exchange information between the image processing apparatus 100 and the user and between the image processing apparatus 100 and a setting apparatus (described below) which sets various operation settings for each unit of the image processing apparatus 100. The I/F unit 140 transfers a control instruction from the user to the control unit 160, and returns to the user an analysis result from the analysis unit 130, compressed data from the compression unit 150, and a response from the control unit 160.

Figure 2:
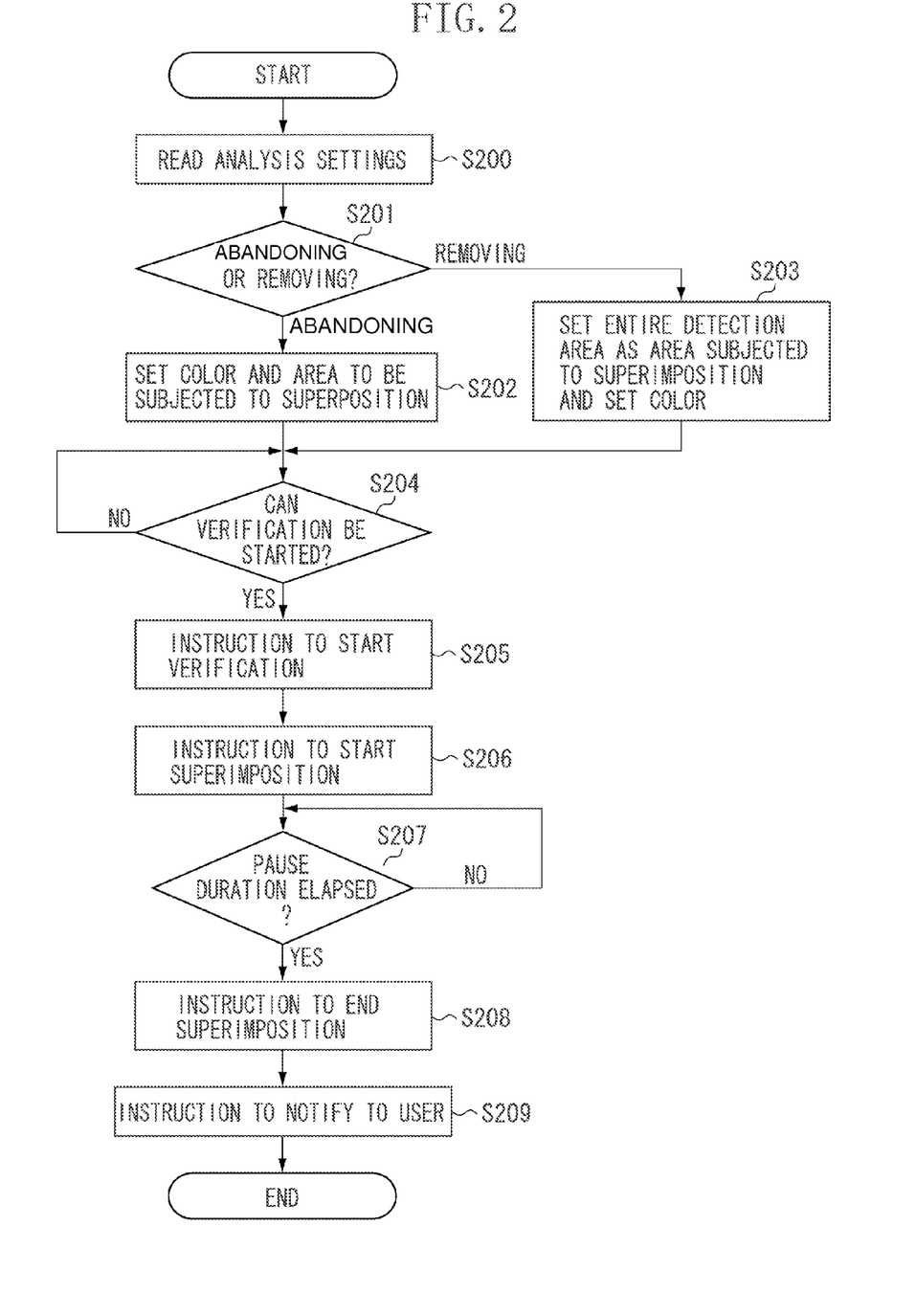
FIG. 2 is a flow chart illustrating an operation of the image processing apparatus.

Processing for verifying the operation of the analysis unit 130 performed by the thus-configured image processing apparatus 100 will be described below with reference to FIG. 2. FIG. 2 illustrates procedures of the program executed by the processor included in the control unit 160 when verifying the operation of the analysis unit 130.

In step S200, upon reception of the instruction for verifying the operation of the analysis unit 130 from the user terminal, the control unit 160 reads the settings for the analysis unit 130 from the storage unit 170.

For example, the control unit 160 reads settings such as an object state analysis type ("abandoning" and "removing"), a screen area subjected to object detection, a size of an object under monitoring, and a pause duration until a relevant state is determined.

In step S201, the control unit 160 determines the state ("abandoning" or "removing") from the settings read from the storage unit 170. The processing proceeds to step S202 or S203 corresponding to the detected state to set respective setting values to the analysis unit 130.

In the case of the "abandoning" state (ABANDONING in step S201), the processing proceeds to step S202. In step S202, the control unit 160 sets the superimposition unit 120 to superimpose an image corresponding to the size and color of the object subjected to detection of abandoning onto the video in the detection area. Specifically, the control unit 160 sets a position in the detection area read from the storage unit 170 as a position at which the image is to be superimposed, and sets a size read from the storage unit 170 as the size and color of the image to be superimposed.

On the other hand, in the case of the "removing" state (REMOVING in step S201), the processing proceeds to step S203. In step S203, the control unit 160 sets the superimposition unit 120 to superimpose an image corresponding to the size of the detection area onto the video in the detection area. Specifically, the control unit 160 sets a size of the detection area as the position and size at which the image is to be superimposed, and sets a color read from the storage unit 170 as the color of the image to be superimposed.

In step S204, after setting values of the image to be superimposed are determined, the control unit 160 determines whether verification is possible. For example, verification cannot be started before the analysis unit 130 has generated a background image. The control unit 160 inquires of the analysis unit 130 whether the analysis unit 130 is activated.

When the analysis unit 130 is not activated, the control unit 160 may instruct the analysis unit 130 to be activated and wait until the analysis unit 130 generates a background image. Alternatively, the control unit 160 may wait until the analysis unit 130 generates a background image after the user instructs the analysis unit 130 to be activated. For example, user instructs the analysis unit 130 to be activated using a start analysis button which is displayed on a display unit of setting apparatus. Alternatively, the analysis unit 130 may have already been activated when starting the verification process shown in FIG. 2.

As mentioned above, object detection is achieved by obtaining a difference in luminance between frames, and an area having a difference exceeding a preset threshold value is recognized as an emerging object. Therefore, when an actual object has already emerged in the detection area at the time of verification, the analysis unit 130 cannot distinguish between the image superimposed by the superimposition unit 120 and the actual object. Therefore, while the detection unit 131 is detecting whether an object has emerged in the video in the detection area, the superimposition unit 120 does not start superimposing the image. Before starting verification, the detection unit 131 can determine whether an object has emerged in the detection area from a result of analysis by the analysis unit 130.

When verification can be started (YES in step S204), the processing proceeds to step S205. In step S205, the control unit 160 instructs the analysis unit 130 to start analyzing an image input from the superimposition unit 120.

In step S206, the control unit 160 controls the superimposition unit 120 to superimpose the image onto the video input from the acquisition unit 110 based on the setting values determined in step S202 or S203. The image to be superimposed onto the video depends on the function of the superimposition unit 120.

For example, when the superimposition unit 120 is configured by the privacy mask function, it draws a polygon or circle filled with a certain color. When the superimposition unit 120 is configured by the superimposition function, it superimposes a character string according to the drawing position and shape determined by the drawing parameters.

Figure 3A:
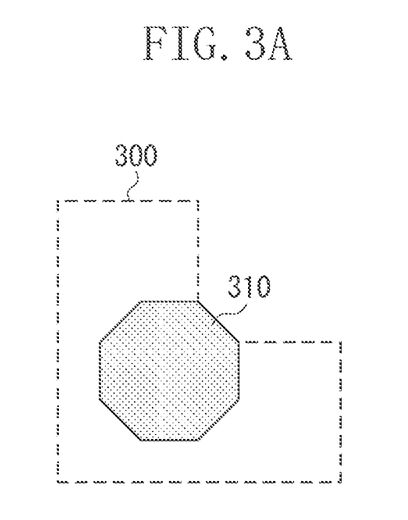
FIGS. 3A and 3B illustrate exemplary images superimposed by a superimposition unit of the image processing apparatus.
Figure 3B:
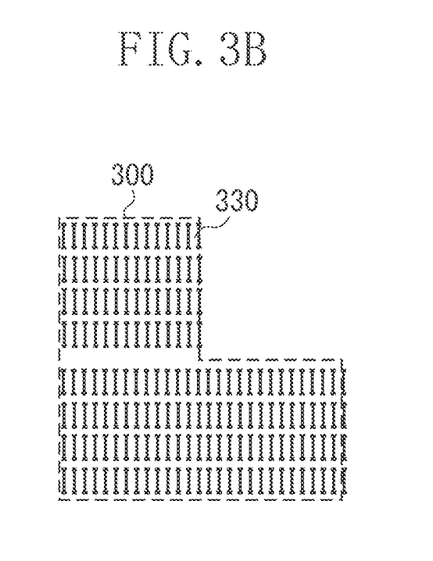

If a character or font can be changed in this case, it is further preferable to put in succession a Chinese character having a large stroke count or "I" (an alphabet capital letter) in the proportional font. FIGS. 3A and 3B each illustrate exemplary superimposition of an image.

FIG. 3A illustrates superimposition of a polygon 310 by using the privacy mask function in the case of the "abandoning" state. FIG. 3B illustrates superimposition of a character string 330 by using the superimposition function in the case of the "removing" state. A frame 300 is illustrated for description but not actually drawn.

In step S207, after the superimposition unit 120 starts superimposing an image, the control unit 160 determines whether the pause duration of the object to be superimposed read in step S200 has elapsed. When the pause duration has elapsed (YES in step S207), the processing proceeds to step S208. In step S208, the control unit 160 instructs the superimposition unit 120 to end superimposing the image.

In step S209, the control unit 160 controls the analysis unit 130 to notify to the user terminal via the I/F unit 140 an analysis result of the video having the image superimposed thereon by the superimposition unit 120.

The control unit 160 controls the operations of the superimposition unit 120 and the analysis unit 130 in this way.

Although the image processing apparatus 100 and the imaging apparatus 180 are independent apparatuses in the present exemplary embodiment, the image processing apparatus 100 may be integrated with the video camera or video recorder, and receive from the acquisition unit 110 successive images captured by any of such imaging apparatuses.

The video camera may be a network camera located on a remote site, which enables remote video observation via a network.

The image processing apparatus 100 according to the present exemplary embodiment enables verifying the function of analyzing object state transition through image processing without moving the actual object under monitoring. Therefore, the image processing apparatus 100 eliminates the need of operation on a video capturing site, thus reducing manpower and time required for verification.

When the present exemplary embodiment is applied to a monitoring camera, the superimposition unit 120 can be achieved by the superimposition function and the privacy mask function of the monitoring camera, enabling configuring an image processing apparatus at lower cost than a case where these functions are separately implemented.

A second exemplary embodiment will be described below centering on a setting apparatus which sets various setting values to the image processing apparatus 100 described in the first exemplary embodiment and instructs the image processing apparatus 100 to detect the emergence of an object via the detection unit 131.

The setting apparatus according to the second exemplary embodiment of the present invention will be described below with reference to FIGS. 4, 5, 6A, and 6B.

Figure 4:
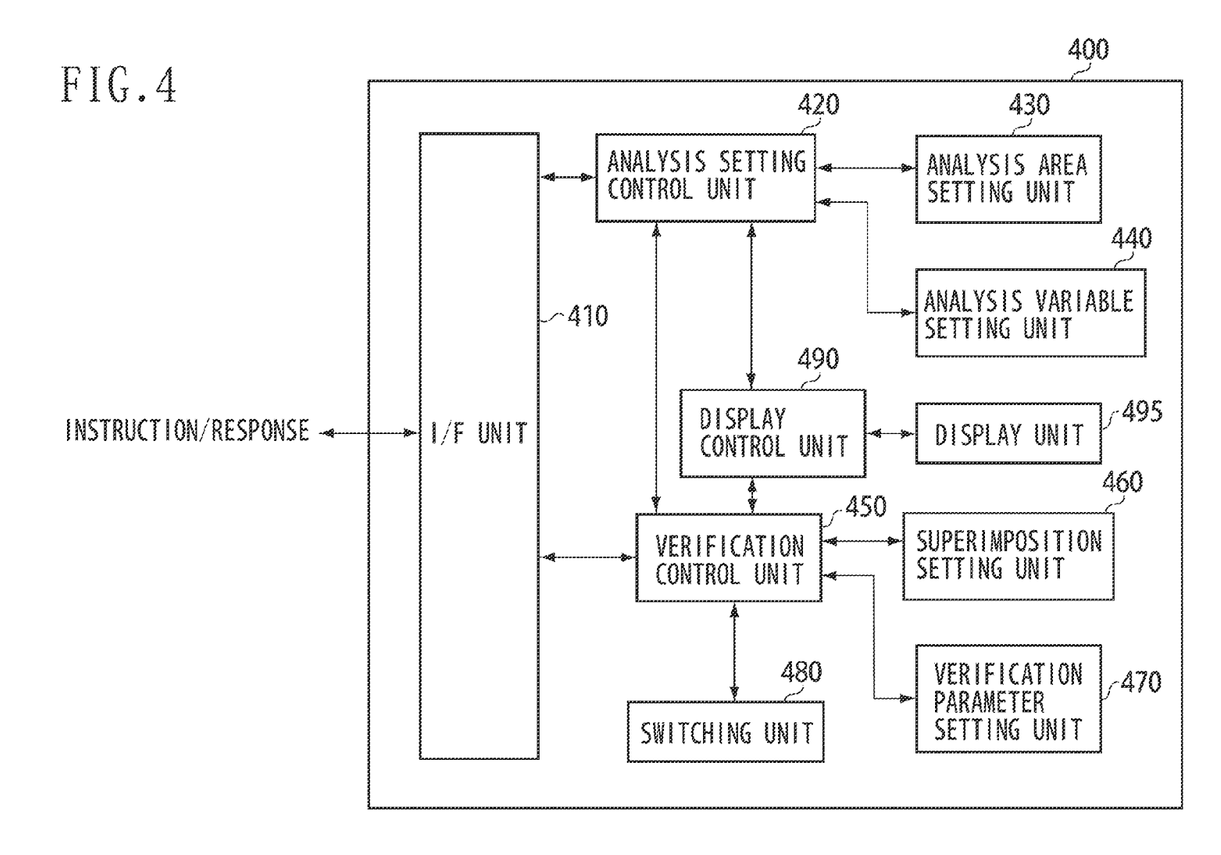
FIG. 4 is a block diagram illustrating a configuration of a setting apparatus.

FIG. 4 is a block diagram illustrating a configuration of the setting apparatus according to the second exemplary embodiment of the present invention. A setting apparatus 400 is a terminal which receives settings and instructions from the user and outputs instructions to an image processing apparatus performing object state analysis, for example, the image processing apparatus 100 according to the first exemplary embodiment of the present invention. The object state analysis refers to, for example, analyzing whether an object is in the "abandoning" or "removing" state in an input video.

The I/F unit 410 is an interface between the setting apparatus 400 according to the second exemplary embodiment and the image processing apparatus 100 performing object state analysis. The I/F unit 410 outputs to the setting apparatus 400 via a network (not illustrated) user-input settings and instructions related to verification of object state analysis as settings and instructions for functions of the image processing apparatus 100 performing object state analysis.

An analysis setting control unit 420 determines an end of input of settings and instructions related to object state analysis by an analysis area setting unit 430 and an analysis variable setting unit 440 (described below), converts them into settings and instructions suitable for the image processing apparatus 100 performing object state analysis, and outputs them to the outside of the setting apparatus 400 via the I/F unit 410.

The settings related to object state analysis include, for example, settings of an object state analysis type, a size range of the object subjected to object state analysis, and a pause duration of the object until the occurrence of an object state transition is determined.

The instructions related to object state analysis include, for example, an instruction for completing settings for object state analysis and then transmitting the settings to the image processing apparatus 100 performing object state analysis, and an instruction for ending the operation of the setting apparatus 400.

Figure 6A:
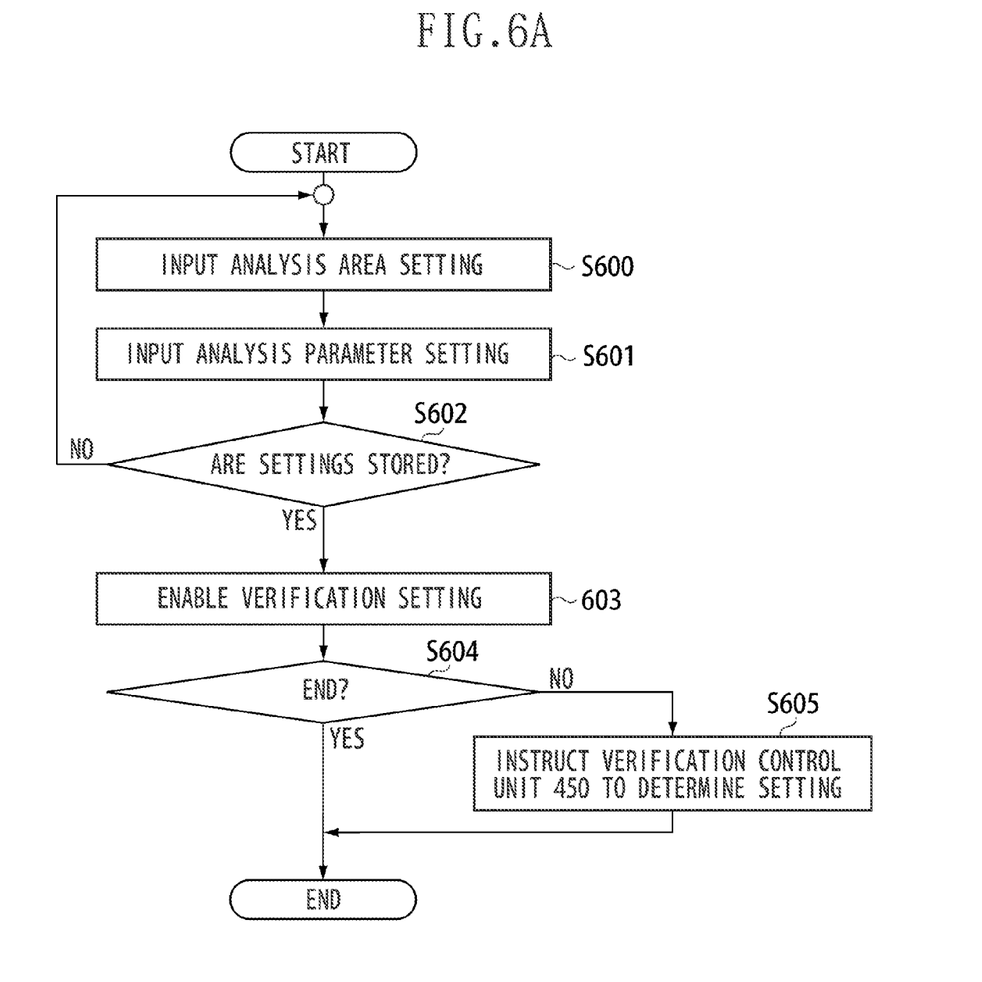
FIGS. 6A and 6B are flow charts illustrating operations of the setting apparatus.

These control operations are performed by a processor and a memory included in the analysis setting control unit 420. The processor included in the analysis setting control unit 420 is a computer which reads a program from the memory included therein and then executes it.

The memory included in the analysis setting control unit 420 is a recording medium storing the program so as to be read by the processor. The program will be described below with reference to FIG. 6A. The analysis setting control unit 420 may be integrated with a verification control unit 450 (described below).

The analysis area setting unit 430 provides a user interface for enabling the user to set a screen area subjected to object state analysis.

The analysis parameter setting unit 440 provides a user interface for enabling the user to set parameters related to object state analysis. The parameters related to the object state analysis include, for example, a parameter related to a size range of the object subjected to object state analysis, and a parameter related to a pause duration of the object until the occurrence of an object state transition is determined.

The verification control unit 450 determines an end of input of settings and instructions related to verification of object state analysis by a superimposition setting unit 460 and a verification parameter setting unit 470, converts them into settings and instructions suitable for the image processing apparatus 100 performing object state analysis, and outputs them to the outside of the setting apparatus 400 via the I/F unit 410.

The settings related to verification of object state analysis include, for example, settings of an analysis area, a shape, size, and range of a graphic pattern to be superimposed as a pseudo object for verification, a color and a pause duration of the graphic pattern to be superimposed, and a selection of object state analysis for verification.

The instructions related to verification of object state analysis include, for example, an instruction for completing settings for verification of object state analysis and then transmitting the settings to the image processing apparatus 100 performing object state analysis, and an instruction for detecting the emergence of an object based on the set conditions.

Specifically, instructions related to verification of object state analysis perform instruction to superimpose an image corresponding to the size of the object to be detected when emerging onto the video in the detection area as a pseudo object for verification, to output the resultant video to the detection unit 131 of the image processing apparatus 100, and to detect the emergence of the object.

These control operations are performed by a processor and a memory included in the verification control unit 450. The processor included in the verification control unit 450 is a computer which reads a program from the memory included therein and then executes it.

The memory included in the verification control unit 450 is a recording medium storing the program so as to be read by the processor. The program will be described below with reference to FIG. 6B. The verification control unit 450 may be integrated with the analysis setting control unit 420.

The superimposition setting unit 460 is a user interface for enabling the user to set a size, shape, superimposing position, and range of an image to be superimposed by the superimposition unit 120 of the image processing apparatus 100 performing object state analysis for verification of object state analysis.

The verification parameter setting unit 470 is a user interface for enabling the user to set parameters for verification of object state analysis. The parameters for verification of object state analysis include, for example, a parameter related to a color and pause duration of an image to be superimposed.

The user uses a switching unit 480 to instruct the image processing apparatus 100 connected with the setting apparatus 400 to perform object state analysis or verification of object sate analysis. The verification of object state analysis refers to verifying whether, when the image processing apparatus 100 performing object state analysis actually performs object state analysis based on the conditions set in the verification control unit 450, a desired object state can be detected.

Figure 5:
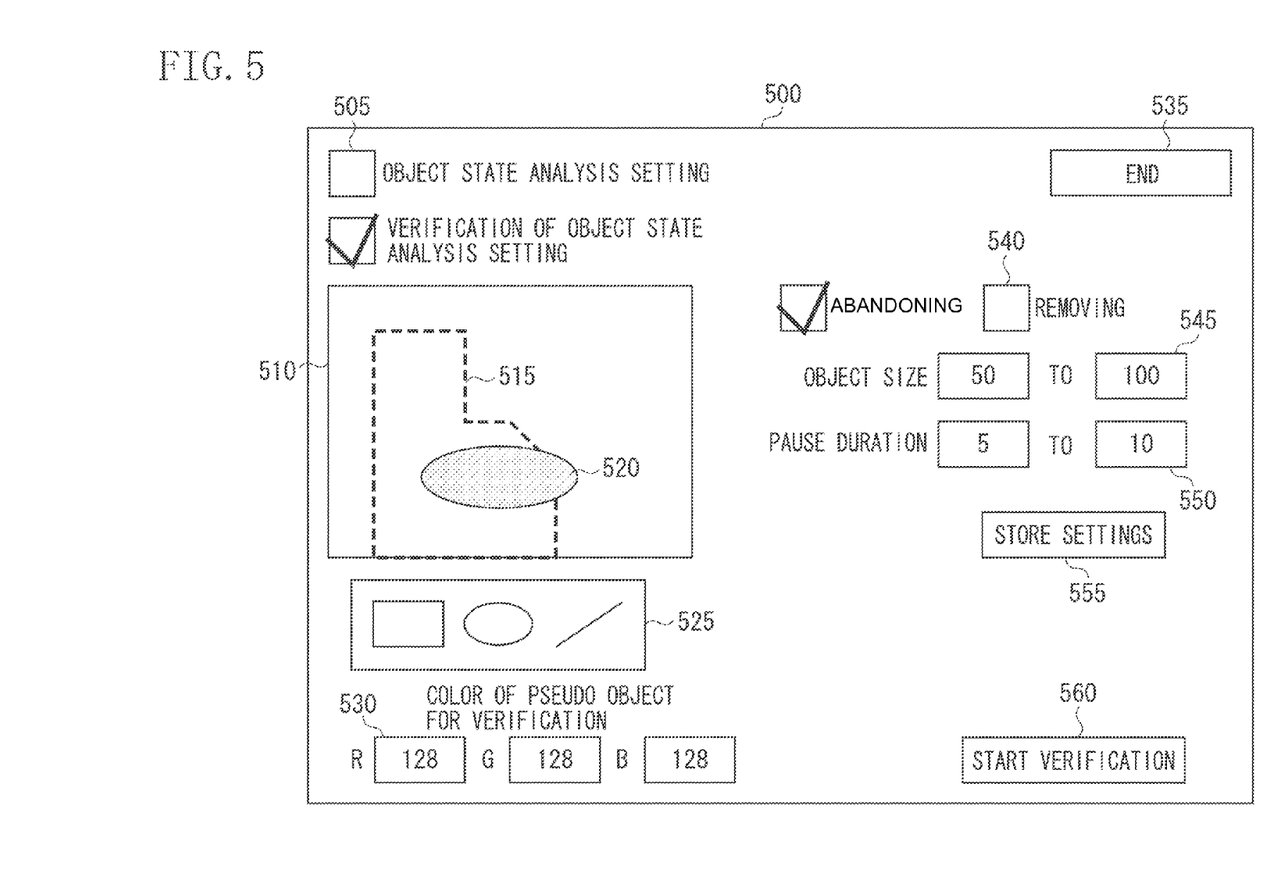
FIG. 5 illustrates a setting screen of the setting apparatus.

The present exemplary embodiment will be described below based on a case where the setting apparatus 400 includes a display unit 495 which displays a setting screen 500 for performing setting for instructing the detection unit 131 of the image processing apparatus 100 (described in the first exemplary embodiment) to detect the emergence of an object.

The setting screen 500 displayed on the display unit 495 serves as a graphical user interface (hereinafter referred to as GUI). The setting apparatus 400 includes a display control unit 490 which instructs the display unit 495 to display the setting screen 500. The setting screen 500 is displayed by a processor and a memory included in the display control unit 490.

The processor included in the display control unit 490 is a computer which reads a program from the memory included therein and then executes it. The memory included in the display control unit 490 is a recording medium storing the program so as to be read by the processor.

An exemplary screen configuration of the setting screen 500 (graphical user interface) displayed on the display unit 495 of the setting apparatus 400 according to the second exemplary embodiment will be described below with reference to FIG. 5.

Radio buttons 505 are used to switch a target setting between object state analysis and verification of object state analysis. Depending on the setting of the radio buttons 505, the switching unit 480 selects whether the image processing apparatus 100 will perform object state analysis or verification of object state analysis.

A graphic pattern input field 510 is used to set a screen area subjected to object state analysis (hereinafter this area is referred to as analysis area) and set a graphic pattern for verification of object state analysis. The target setting is selected according to the setting of the radio buttons 505. Specifically, when the radio button 505 for object state analysis is selected, the user can set an analysis area in the graphic pattern input field 510.

On the other hand, when the radio button 505 for verification of object state analysis is selected, the user can set an image or a pseudo object in the graphic pattern input field 510. The set image or pseudo object is superimposed by the image processing apparatus 100 performing object state analysis for verification of object state analysis.

A drawing tool selection palette 525 is used to select drawing tools (rectangle, ellipse, straight line, etc) and set a position and shape of the analysis area or pseudo object in the graphic pattern input field 510. A polygon frame 515 is an exemplary analysis area, and a pseudo object 520 is an exemplary image to be superimposed.

When the radio button 505 for object state analysis is selected, the analysis area setting unit 430 sets a screen area subjected to object state analysis according to an input from the drawing tool selection palette 525.

When the radio button 505 for verification of object state analysis is selected, the superimposition setting unit 460 sets a size, shape, superimposing position, and range of an image to be superimposed according to an input from the drawing tool selection palette 525.

Thus, the drawing tool selection palette 525 functions as a specification unit for specifying an image corresponding to the size of the object to be detected when emerging by the detection unit 131 of the image processing apparatus 100 according to the first exemplary embodiment.

A parameter input field 530 is used to input parameters for verification of object state analysis. Referring to FIG. 5, the user sets RGB values to the parameter input field 530 to specify the color of a graphic pattern to be drawn in the graphic pattern input field 510 by using the drawing tool selection palette 525.

When performing verification of object state analysis, the user can adjust the color of the graphic pattern to be input by using the parameter input filed 530. Thus, the user can verify what object color enables object state analysis.

Further, the user may set a pause duration of the graphic pattern input by using the parameter input field 530. The user can verify object state analysis using a pause duration of the input graphic pattern as required. Thus, the user can verify what pause duration enables object state analysis, during which the object to be detected remains still.

The parameters input from the parameter input field 530 are not limited to parameters related to a color and pause duration of the input graphic pattern. The verification parameter setting unit 470 sets parameters for verification of object state analysis according to inputs from the parameter input field 530.

The user uses an END button 535 to give an instruction to end the operation of the setting apparatus 400.

The user uses a type selection button 540 to select a type of object state analysis, "ABANDONING" or "REMOVING."

The user uses an object size input field 545 to specify a size range of an object subjected to object state analysis. The user uses a pause duration input field 550 to specify a duration during which the object subjected to object state analysis remains still until the occurrence of an object state transition ("abandoning" or "removing") is determined.

The analysis parameter setting unit 440 sets parameters related to object state analysis according to inputs from the object size input field 545 and the pause duration input field 550.

A store settings button 555 instructs the setting apparatus 400 to complete the settings of object state analysis, and then transmit the settings to the image processing apparatus 100 performing object state analysis.

A start verification button 560 instructs the setting apparatus 400 to complete settings for verification of object state analysis, and then transmit the settings to the image processing apparatus 100 performing object state analysis, to instruct the image processing apparatus 100 to start verification. The start verification button 560 functions as a starting unit for instructing the superimposition unit 120 of the image processing apparatus 100 according to the first exemplary embodiment to start superimposing the image specified by the drawing tool selection palette 525 onto the video in the detection area and then outputting the resultant video to the detection unit 131.

Figure 6B:
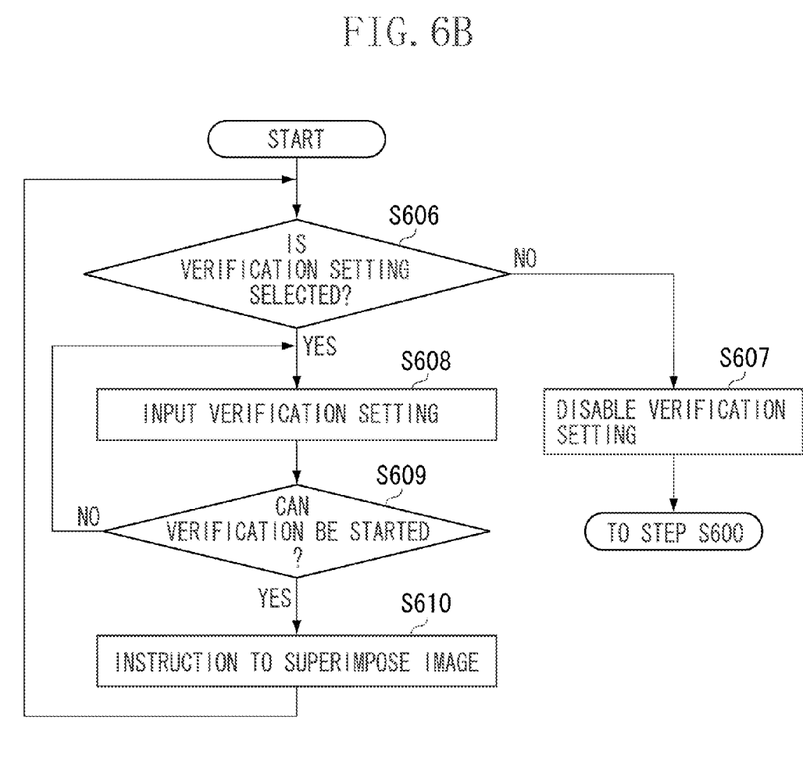

The operation flow of processing performed by the thus-configured setting apparatus 400 will be described below with reference to FIGS. 6A and 6B. FIG. 6A illustrates a procedure of the program executed by the processor included in the analysis setting control unit 420. FIG. 6B illustrates a procedure of the program executed by the processor included in the verification control unit 450.

Processing performed by the analysis setting control unit 420 will be described below with reference to FIG. 6A. In step S600, after the setting apparatus 400 is activated, the analysis setting control unit 420 determines whether the analysis area setting unit 430 receives setting of a screen area subjected to object state analysis and, when a relevant setting is input, performs necessary input processing such as conversion into internal values.

In step S601, the analysis setting control unit 420 further determines whether the analysis parameter setting unit 440 receives an analysis parameter and, when a relevant setting is input, performs necessary input processing such as conversion into internal values. The analysis setting control unit 420 repeats the above-mentioned processing until the user completes the setting process. Specifically, in step S602, the analysis setting control unit 420 determines whether, for example, the user presses the store settings button 555.

When the user completes the setting process (YES in step S602), the processing proceeds to step S603. In step S603, the analysis setting control unit 420 transmits via the I/F unit 410 the settings to the image processing apparatus 100 performing object state analysis so as to be stored as setting values. Then, the analysis setting control unit 420 enables an interface related to verification setting. In step S604, the analysis setting control unit 420 determines whether the user gives an instruction to end the setting process, for example, the user presses the END button 535. When the user gives an instruction to end the setting process (YES in step S604), the processing ends.

When the user does not give an instruction to end the setting process (NO in step S604), the processing proceeds to step S605. In step S605, the analysis setting control unit 420 instructs the verification control unit 450 to determine whether the target setting is object state analysis or verification of object state analysis.

Processing performed by the verification control unit 450 will be described below with reference to FIG. 6B. In step S606, upon reception of the instruction from the analysis setting control unit 420, the verification control unit 450 checks the setting of the radio buttons 505 to determine whether the target setting is object state analysis or verification of object state analysis.

When the target setting is object state analysis (NO in step S606), the processing proceeds to step S607. In step S607, the verification control unit 450 disables the interface related to the verification setting. Then, the processing returns to step S600. In step S600, the verification control unit 450 instructs the analysis setting control unit 420 to input the setting of object state analysis.

On the other hand, when the target setting is verification of object state analysis (YES in step S606), the processing proceeds to step S608. In step S608, the verification control unit 450 determines whether the superimposition setting unit 460 receives a setting of the shape of a graphic pattern to be superimposed and, when a relevant setting is input, performs necessary input processing such as conversion into internal values. Then, the verification control unit 450 repeats the above-mentioned processing until the user completes the setting process. Specifically, in step S609, the verification control unit 450 determines whether, for example, the user presses the start verification button 560.

When the user completes the setting process (YES in step S609), the processing proceeds to step S610. In step S610, the verification control unit 450 transmits via the I/F unit 410 the settings to the image processing apparatus 100 performing object state analysis as an image superimposition instruction. Then, the image processing apparatus 100 connected to the setting apparatus 400 starts verification by superimposing a graphic pattern (pseudo object). Upon completion of superimposition, the processing returns to step S606. The verification control unit 450 repeats processing from step S606.

When the image processing apparatus 100 starts verification, the verification state is displayed on the display unit 495. An exemplary verification state will be described below with reference to FIGS. 7A to 7C. A display window 600 displays an image output from the image processing apparatus 100. The display window 600 is displayed on the display unit 495 of the setting apparatus 400.

Figure 7A:
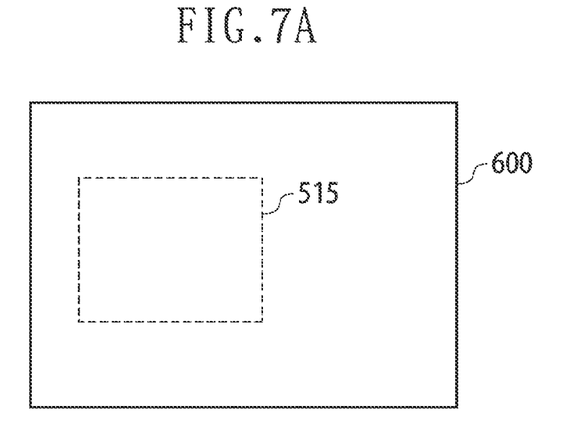
FIGS. 7A, 7B, and 7C illustrate states of a window displayed on the setting apparatus when performing verification.

When the image processing apparatus 100 starts verification, a frame 515 indicating an analysis area is displayed in the display window 600, as illustrated in FIG. 7A. However, the frame 515 does not necessarily need to be displayed.

Figure 7B:
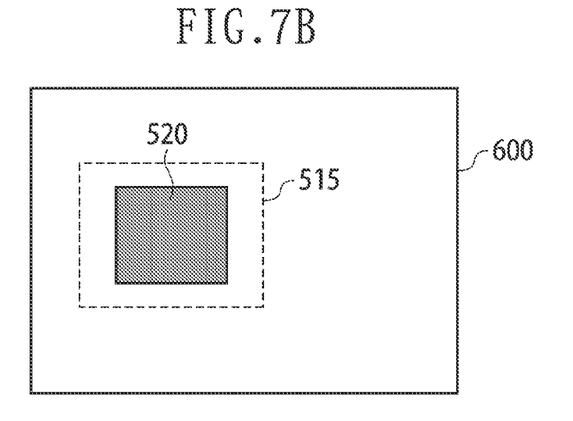

Then, as illustrated in FIG. 7B, the display window 600 displays a state where the pseudo object 520 set in the setting apparatus 400 is superimposed onto a captured image by the superimposition unit 120 of the image processing apparatus 100.

Figure 7C:
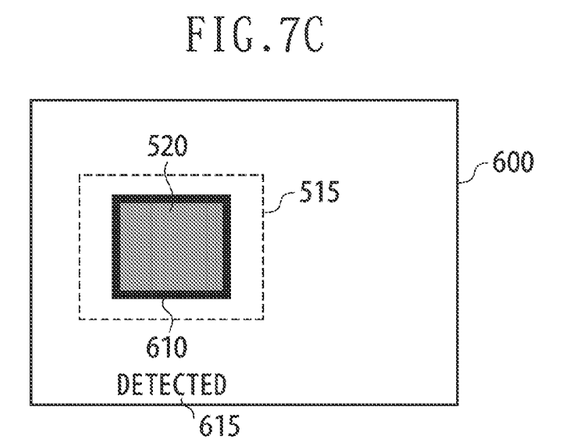

Then, as illustrated in FIG. 7C, the display window 600 displays a state where the image output from the superimposition unit 120 is analyzed by the analysis unit 130 and then detected as an object state transition. When an object state transition is detected, the display window 600 displays a thick frame 610 around the detected object.

The display window 600 also displays a message 615 to indicate that an object state transition is detected. Although FIG. 7C illustrates a state where the object with object state transition is enclosed by the thick frame 610, the frame is not limited thereto but may be a color frame.

The message 615 does not necessarily need to be displayed. For example, the image processing apparatus 100 may notify the user of an E-mail message indicating the detection of an object state transition.

As mentioned above, the image processing system according to the present invention enables verifying the detection of object state transition.

Although the image processing apparatus 100 and the setting apparatus 400 are independent apparatuses in the exemplary embodiments, both apparatuses may be integrated as one apparatus.

The setting apparatus 400 according to the present exemplary embodiment enables verifying the function of analyzing object state transition through image processing while changing a graphic pattern (pseudo object) in diverse ways. The setting apparatus 400 eliminates the need of preparing a number of actual objects under monitoring. It enables repeating verification while immediately changing analysis settings even when state transition cannot be analyzed, thus reducing manpower and time required for extensive verification.

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium). In such a case, the system or apparatus, and the recording medium where the program is stored, are included as being within the scope of the present invention.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2010-108783 filed May 10, 2010, which is hereby incorporated by reference herein in its entirety.

What is claimed is:

1. An image processing apparatus comprising:
 a detection unit configured to detect emergence of an object based on inter-frame difference method or background difference method;
 an acquisition unit configured to acquire a video without emerging an actual object;
 a setting unit configured to set a size of a substitute image to be superimposed onto the acquired video using a user interface;
 a superimposition unit configured to superimpose the substitute image corresponding to the set size onto the acquired video without emerging an actual object and output to the detection unit the acquired video onto which the substitute image corresponding to the set size is superimposed; and
 an output unit configured to output an analysis result of the detection unit.

2. The image processing apparatus according to claim 1, further comprising:
 a determination unit configured to determine the state of the object in the video in a detection area based on a result of detection by the detection unit,
 wherein, in the case that the determination unit determines a abandoning state where the object emerges in the detection area and remains still for a predetermined duration, the superimposition unit is configured to superimpose an image corresponding to the size of the object onto the video in the detection area, and to output the resultant video to the detection unit.

3. The image processing apparatus according to claim 1, further comprising:
 a determination unit configured to determine the state of the object in the video in a detection area based on a result of detection by the detection unit,
 wherein, in the case that the determination unit determines a removing state where the object in the detection area is removed and an image of a new object that has been covered by the object emerges, the superimposition unit is configured to superimpose an image corresponding to the size of the detection area onto the video in the detection area, and to output the resultant video to the detection unit.

4. The image processing apparatus according to claim 1, wherein the superimposition unit is configured to superimpose an image of a character, a polygon, or an ellipse onto the video acquired by the acquisition unit.

5. The image processing apparatus according to claim 1, wherein the superimposition unit is configured to not start superimposing the image while the detection unit is detecting the emergence of the object in the video in a detection area.

6. The image processing apparatus according to claim 1, further comprising:
 an imaging unit,
 wherein the acquisition unit acquires a video captured by the imaging unit.

7. A setting apparatus for an image processing apparatus including an instruction unit configured to instruct the image processing apparatus according to claim 1 to detect the emergence of the object via the detection unit,
 wherein the instruction unit can instruct the superimposition unit to superimpose an image corresponding to the size of the object to be detected if emerging onto the video in a detection area, and output the video in which the image corresponding to the size of the object is superimposed to the detection unit.

8. The setting apparatus according to claim 7, further comprising:
 a superimposition setting unit configured to set a size, shape, or superimposing position, in the detection area, of the image to be superimposed by the superimposition unit.

9. The setting apparatus according to claim 7, further comprising:
 a parameter setting unit configured to set at least one of color and pause duration of the image to be superimposed by the superimposition unit.

10. A setting apparatus including an instruction unit configured to instruct the image processing apparatus according to claim 1 to detect the emergence of the object via the detection unit, the setting apparatus comprising:
 a display unit configured to display a setting screen for performing settings for instructing the detection unit to detect the emergence of an object;
 a specification unit configured to specify an image corresponding to the size of the object to be detected if emerging; and
 a starting unit configured to instruct the superimposition unit to start superimposing the image specified by the specification unit onto the video in a detection area, and outputting the video in which the image corresponding to the size of the object is superimposed to the detection unit,
 wherein the specification unit and the starting unit are provided on the setting screen.

11. The image processing apparatus according to claim 1, wherein the setting unit sets a pause duration of the substitute image to be superimposed.

12. A method for processing an image, comprising:
   detecting emergence of an object based on inter-frame difference method or background difference method;
   acquiring a video without emerging an actual object;
   setting a size of a substitute image to be superimposed onto the video using a user interface;
   superimposing the substitute image corresponding to the set size onto the acquired video without emerging an actual object and outputting the acquired video onto which the substitute image corresponding to the set size is superimposed; and
   outputting an analysis result of the detecting step.

13. A method by a setting apparatus including an instruction unit configured to instruct the image processing apparatus according to claim 1 to detect the emergence of the object via the detection unit and a receiving unit, the method comprising:
   instructing, by the instruction unit, the superimposition unit to superimpose an image corresponding to the size of the object to be detected if emerging onto the video in a detection area, and to output the video in which the image corresponding to the size of the object is superimposed to the detection unit; and
   receiving, by the receiving unit, a result of the detection by the detection unit from the image processing apparatus.

14. A non-transitory computer-readable storage medium storing a program for causing a computer to execute a method for superimposing an image corresponding to the size of an object to be detected when emerging onto a video in a detection area to detect the emergence of the object, the method comprising:
   detecting emergence of an object based on inter-frame difference method or background difference method;
   acquiring a video without emerging an actual object;
   setting a size of a substitute image to be superimposed onto the video using a user interface;
   superimposing the substitute image corresponding to the set size onto the acquired video without emerging an actual object and outputting the acquired video onto which the substitute image corresponding to the set size is superimposed; and
   outputting an analysis result of the detecting step.

15. A non-transitory computer-readable storage medium storing a program for causing a computer, which is configured to instruct an image processing apparatus, which includes an instruction unit configured to instruct the image processing apparatus according to claim 1 to detect the emergence of the object via the detection unit and a receiving unit, the method comprising;
   instructing the superimposition unit to superimpose an image corresponding to the size of the object to be detected if emerging on the video in a detection area, and to output the video in which the image corresponding to the size of the object is superimposed to the detection unit; and
   receiving, by the receiving unit, a result of the detection by the detection unit from the image processing apparatus.

16. An image processing system comprising:
   an image processing apparatus including
      an acquisition unit configured to acquire a video without emerging an actual object;
      a detection unit configured to detect emergence of an object based on inter-frame difference method or background difference method;
      a setting unit configured to set a size of a substitute image to be superimposed onto the acquired video using a user interface;
      a superimposition unit configured to superimpose the substitute image corresponding to the set size onto the acquired video without emerging an actual object and output to the detection unit the acquired video onto which the substitute image corresponding to the set size is superimposed; and
   an output unit configured to output an analysis result of the detection unit; and
   a setting apparatus for an image processing apparatus including
      an instruction unit configured to instruct the image processing apparatus to detect the emergence of the object via the detection unit,
      wherein the instruction unit can instruct the superimposition unit to superimpose an image corresponding to the size of the object to be detected if emerging onto the video in a detection area, and output the video in which the image corresponding to the size of the object is superimposed to the detection unit.

* * * * *